[19] United States Patent
Sanctis et al.

(10) Patent No.: US 12,443,689 B2
(45) Date of Patent: Oct. 14, 2025

(54) TWO-FACTOR AUTHENTICATION INTEGRATING DYNAMIC QR CODES

(71) Applicant: Bank of America Corporation, Charlotte, NC (US)

(72) Inventors: Jennifer Sanctis, Charlotte, NC (US); Taylor Farris, Hoboken, NJ (US); Vishwas Korde, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 214 days.

(21) Appl. No.: 18/215,909

(22) Filed: Jun. 29, 2023

(65) Prior Publication Data

US 2025/0005127 A1  Jan. 2, 2025

(51) Int. Cl.
*G06F 21/36* (2013.01)
*G06F 21/32* (2013.01)

(52) U.S. Cl.
CPC .............. *G06F 21/36* (2013.01); *G06F 21/32* (2013.01)

(58) Field of Classification Search
CPC .................................. G06F 21/36; G06F 21/32
See application file for complete search history.

(56) References Cited

U.S. PATENT DOCUMENTS

| | | |
|---|---|---|
| 8,281,375 B2 | 10/2012 | von Krogh |
| 8,572,684 B1 | 10/2013 | Sama |
| 9,106,645 B1 | 8/2015 | Vadlamani |
| 9,124,433 B2 | 9/2015 | Marien et al. |
| 9,203,824 B1 * | 12/2015 | Nunn ..................... G06F 21/31 |
| 9,213,820 B2 | 12/2015 | Farraro |
| 9,262,759 B2 | 2/2016 | Hanson et al. |
| 9,294,476 B1 | 3/2016 | Lurey et al. |
| 9,384,481 B2 | 7/2016 | Hanson et al. |

(Continued)

FOREIGN PATENT DOCUMENTS

| | | |
|---|---|---|
| CN | 109547196 | 3/2019 |
| WO | WO2017039354 | 3/2017 |

OTHER PUBLICATIONS

No stated author; How to Scan A QR code in a Photo Using Google Lens; 2020; retrieved from the Internet https://seniortechclub.com/nuggets/how-to-scan-a-qr-code-in-a-photo-using-google-lens/; pp. 1-5, as printed (Year: 2020).*

(Continued)

*Primary Examiner* — Michael W Chao
(74) *Attorney, Agent, or Firm* — Weiss & Arons LLP

(57) ABSTRACT

A method for pre-authenticating a user into a secure session on an entity application running on a second computing device leveraging a first computing device of the user as an authenticator may be provided. The method may include generating at the first computing device a dynamic QR code in response to receipt of a request to generate the dynamic QR code and further capturing, by the second computing device, the dynamic QR code from the first computing device. The method may further include storing, but not parsing, the dynamic QR code at the second computing device. Wherein at a time of a retrieval of the dynamic QR code from the second computing device, the method may include parsing the dynamic QR code and accessing a short URL that may either redirect the web browser to an authentication webpage thereby authenticating the secure session, or a denial webpage.

13 Claims, 8 Drawing Sheets

(56) References Cited

U.S. PATENT DOCUMENTS

| | | | |
|---|---|---|---|
| 9,589,123 B2 | 3/2017 | Farraro | |
| 9,646,300 B1 | 5/2017 | Zhou et al. | |
| 9,673,975 B1 | 6/2017 | Machani | |
| 9,768,963 B2 | 9/2017 | Chu et al. | |
| 9,811,818 B1 | 11/2017 | Xing | |
| 9,830,589 B2 | 11/2017 | Xing | |
| 9,832,019 B2 | 11/2017 | Choi | |
| 9,871,785 B1 | 1/2018 | Triandopoulos et al. | |
| 9,906,524 B2 | 2/2018 | Shibata et al. | |
| 9,930,034 B2 | 3/2018 | Ekambaram et al. | |
| 10,122,719 B1 | 11/2018 | Vltavsky et al. | |
| 10,158,489 B2 | 12/2018 | Shastri et al. | |
| 10,587,613 B2 | 3/2020 | Ledesma | |
| 11,296,874 B2 | 4/2022 | Harris et al. | |
| 12,333,519 B2* | 6/2025 | Jamkhedkar | G06Q 20/3274 |
| 12,373,817 B2* | 7/2025 | DeSoto | H04L 63/10 |
| 2006/0021003 A1* | 1/2006 | Fisher | H04L 63/0861 726/1 |
| 2007/0019215 A1* | 1/2007 | Yu | H04N 1/00973 358/1.3 |
| 2009/0097459 A1 | 4/2009 | Jendbro et al. | |
| 2009/0300738 A1 | 12/2009 | Dewe et al. | |
| 2011/0197266 A1 | 8/2011 | Chu et al. | |
| 2013/0024299 A1* | 1/2013 | Wong | G06Q 50/12 705/15 |
| 2013/0212286 A1* | 8/2013 | Krishnakumar | H04L 65/1066 709/227 |
| 2013/0219479 A1* | 8/2013 | DeSoto | G06Q 20/4014 726/6 |
| 2013/0283397 A1* | 10/2013 | Griffin | G06F 21/629 726/28 |
| 2014/0129733 A1* | 5/2014 | Klais | H04L 67/63 709/239 |
| 2014/0173695 A1* | 6/2014 | Valdivia | G06F 21/33 726/4 |
| 2014/0333415 A1 | 11/2014 | Kursun | |
| 2014/0351911 A1 | 11/2014 | Yang et al. | |
| 2015/0041530 A1* | 2/2015 | Burkhart | G06K 7/1404 235/494 |
| 2015/0088760 A1 | 3/2015 | Meurs | |
| 2015/0234891 A1* | 8/2015 | Liu | G06F 16/29 707/769 |
| 2015/0261948 A1 | 9/2015 | Marra et al. | |
| 2016/0057123 A1* | 2/2016 | Jiang | H04L 67/14 726/7 |
| 2016/0162873 A1 | 6/2016 | Zhou et al. | |
| 2016/0255161 A1* | 9/2016 | Lim | G06Q 30/0207 455/456.3 |
| 2016/0294817 A1 | 10/2016 | Tan et al. | |
| 2016/0337346 A1 | 11/2016 | Momchilov et al. | |
| 2017/0032370 A1 | 2/2017 | Beltramino et al. | |
| 2017/0083909 A1 | 3/2017 | Mork et al. | |
| 2017/0249628 A1 | 8/2017 | Douglas et al. | |
| 2017/0300732 A1* | 10/2017 | Likar | H04W 12/068 |
| 2017/0346851 A1 | 11/2017 | Drake | |
| 2018/0278422 A1* | 9/2018 | Young | G06Q 10/02 |
| 2018/0359635 A1* | 12/2018 | Lerner | H04L 9/14 |
| 2019/0164167 A1* | 5/2019 | Embree | G06Q 20/3274 |
| 2019/0174304 A1 | 6/2019 | Tunnell et al. | |
| 2019/0303556 A1* | 10/2019 | Jain | G06F 21/35 |
| 2020/0068029 A1* | 2/2020 | Lim | H04W 4/021 |
| 2020/0074070 A1 | 3/2020 | Boodaei | |
| 2020/0092272 A1* | 3/2020 | Eisen | H04L 63/0869 |
| 2020/0092287 A1* | 3/2020 | Cano | H04L 63/18 |
| 2020/0128594 A1 | 4/2020 | Shantharam et al. | |
| 2020/0143375 A1* | 5/2020 | Gurunathan | G06Q 20/409 |
| 2020/0233949 A1* | 7/2020 | Xia | H04W 12/08 |
| 2020/0351264 A1* | 11/2020 | Pellizzer | G06Q 20/3276 |
| 2020/0404019 A1 | 12/2020 | Drake | |
| 2021/0073359 A1 | 3/2021 | Boodaei et al. | |
| 2022/0004617 A1 | 1/2022 | Irwin, III | |
| 2022/0086134 A1 | 3/2022 | Xie | |
| 2022/0095006 A1* | 3/2022 | Seed | H04N 21/4788 |
| 2022/0150237 A1* | 5/2022 | Canfield | H04L 63/104 |
| 2022/0303036 A1* | 9/2022 | Anderton | H04L 67/02 |
| 2022/0406112 A1* | 12/2022 | Calleberg | E05B 17/226 |
| 2023/0163981 A1* | 5/2023 | Subramanian | G09C 5/00 713/189 |
| 2023/0284013 A1* | 9/2023 | Schmidt | H04W 12/06 726/6 |
| 2023/0419067 A1* | 12/2023 | Wu | H04L 9/3226 |
| 2024/0378938 A1* | 11/2024 | Ostema | G07F 9/001 |

OTHER PUBLICATIONS

Alex Perala, "Apple Exploring Face ID for Apple Watch 4," https://mobileidworld.com/face-id-for-apple-watch-4-904233/, Mobile ID World, Apr. 24, 2018.

Eric Weiss, "Apple Patent Could Bring Face ID to Apple Watch," https://mobileidworld.com/biometrics-news-apple-patent-could-bring-face-id-apple-watch-111906/, Mobile ID World, Nov. 19, 2019.

"Apple Patent Points to Face ID coming to Apple Watch along with Band Sensors to Analyze Sports Performance and More," https://www.patentlyapple.com/patentlyapple/2018/03/apple-patent-points-to-face-id-coming-to-apple-watch-along-with-bandsensors-to-analyze-sports-performance-and-more.html, Patently Apple, Jun. 9, 2020.

Benjamin Mayo, "Rumor: Apple Developing Touch ID fingertip Biometrics for Apple Watch, Series 2 will not Support WatchOS 7," https://9to5mac.com/2020/03/27/rumor-apple-developing-touch-id-fingerprint-biometrics-for-apple-watch-series-2-will-not-support-watchos-7/, Word Press.com VIP, Mar. 27, 2020.

E. Grosse et al., "Authentication at Scale," in IEEE Security & Privacy, vol. 11, No. 1, pp. 15-22, Jan.-Feb. 2013.

F. Aloul et al., "Two Factor Authentication Using Mobile Phones," 2009 IEEE/ACS International Conference on Computer Systems and Applications, 2009, pp. 641-644.

Shah, Syed W., and Salil S. Kanhere, "Recent Trends in User Authentication-a Survey," IEEE Access 7 (2019): 112505-112519 (Year: 2019).

* cited by examiner

TWO-FACTOR AUTHENTICATION INTEGRATING DYNAMIC QR CODES

FIELD OF TECHNOLOGY

Aspects of the disclosure relate to secure authentication into a computer application.

BACKGROUND OF THE DISCLOSURE

Entry into a computer application is usually secured by an authentication method. Relatively simple authentication methods require a user to enter a username and password. Upon entry of the username and password, the user may be allowed entry into the computer application.

More complicated authentication methods include two-factor authentication. Two-factor authentication requires a username and password as well as another form of authentication. The second factor of authentication may include entry of an additional data element after entering the username and password. The additional data element may be transmitted, substantially contemporaneously with the user authentication, to the user. Adding an additional data element manually is more time consuming than simple authentication methods.

It would be desirable, therefore, to provide two-factor authentication methods that do not require manual entry of an additional data element, such as by capturing a displayed image to leverage two-factor authentication.

Some authentication methods for a first device require a user to obtain a code from a second device. These methods cannot generally be leveraged, however, when the second device is not in the vicinity of the user.

It would be further desirable, therefore, to provide for authentication methods that provides systems and methods for usage even when the second device is not accessible to the user at the time of the authentication. Such systems and methods may include configuring the second device to provide a data element that can be used by the user during authentication, at a time after the providing of the data element. The data element may be a dynamic data element that will only provide authentication to the user during a predetermined time period.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
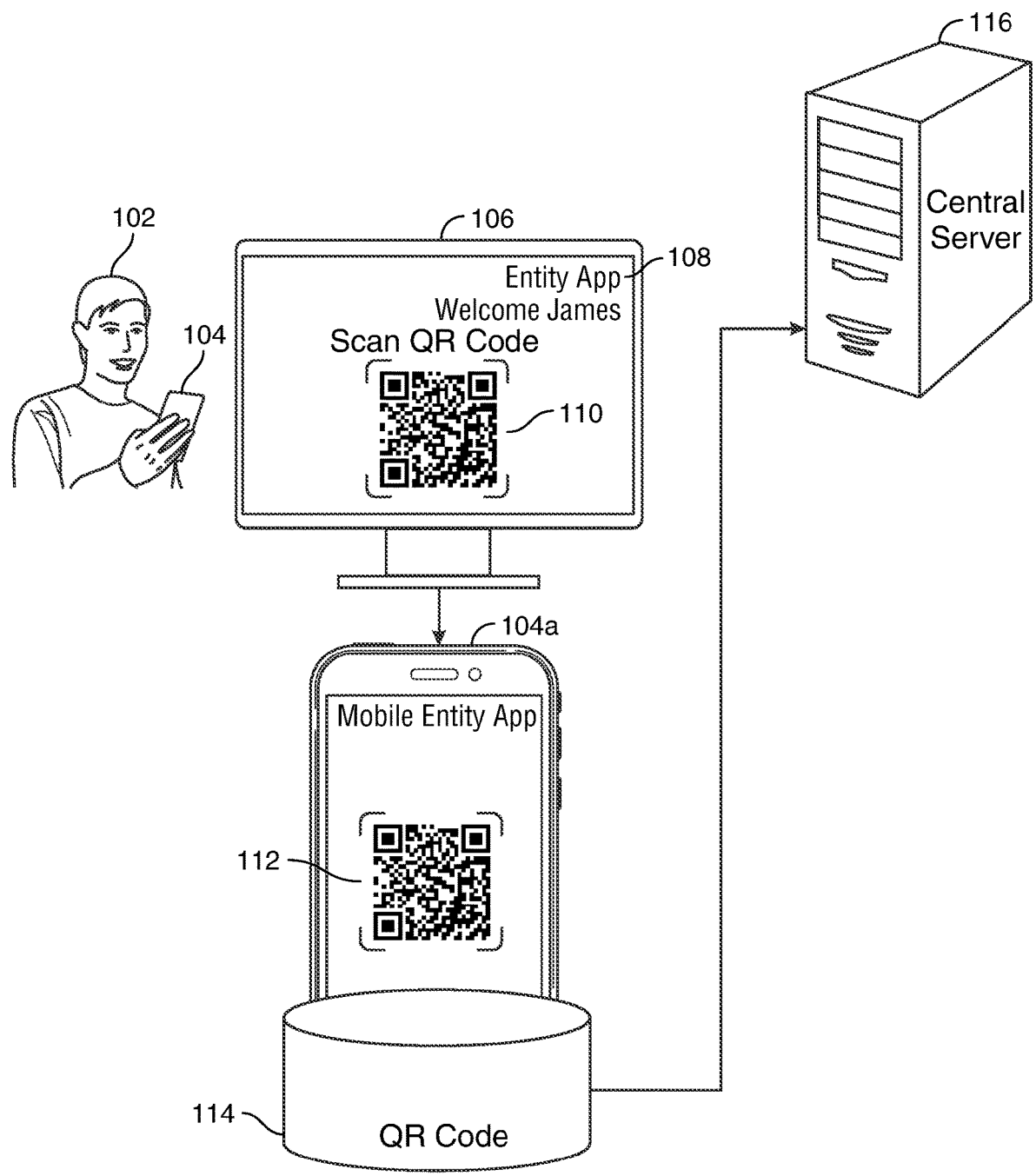
FIG. 1 shows an illustrative diagram in accordance with principles of the disclosure.

A system for pre-authenticating a user into a secure session on an entity application running on a computing device is provided. The entity application may be running on a web browser on the computing device. The session may be a secure session for viewing and editing data associated with the user's account. The secure session may be for performing transactions, transferring of data and/or funds or any other suitable activity associated with the user's account.

The entity application may be associated with an entity. The entity may have an entity application that may be accessed on a desktop computer and on mobile computing devices. Users of the entity may have an account that may be accessed via the entity application. The account authorization data may be the same for both the entity app running on a desktop computer and for the entity app running on the mobile device. Users may be required to login with account authorization data for each computing device.

Pre-authenticating a user into a secure session on an entity application running on a second computing device may be desirable. The authenticating may be performed via a first computing device of the user as an authenticator.

Entity applications may run on a plurality of computing devices of a user. Entity applications may be accessible via internet and/or as an app downloaded to the user's device. Entity applications may be accessed as a web application on the internet. The entity application may be accessed via selecting a uniform resource locator ("URL") that links to the entity application. The entity application may be accessed by inputting the URL in a web browser.

In some embodiments, the entity application may be an app that is accessible without the internet.

Each user may have one account profile that may be accessed both the entity application running on a desktop computer and the entity application running on the mobile device. Users may need to authenticate access to the account profile on each computing device.

The user may be required to authenticate into each of the entity applications running on the different computing devices.

The system may be used when authentication via two computing devices may be leveraged however one of the computing devices may not be in the vicinity of the user at the time of authentication. The system may enable the first computing device to pre-authenticate the user at the second computing device.

The system may leverage one computing device to generate a quick response ("QR") code for use at the second computing device. The QR code may be a static QR code. The QR code may be a dynamic QR code. The QR code, in some embodiments, may be a graphical image that may be unique for each request for authentication into a secure session.

The user may select the time period for the time the user may wish to authenticate into the mobile entity application. The selection may be performed at the second computing device. The dynamic QR code may then be embedded with the time period that has been selected for access of the dynamic QR code. The dynamic QR code may be invalid when selected outside the time period. The time period may be within 24 hours of the time of the generation of the dynamic QR code. The time period may be within 12 hours.

The time period may be more than one day. The time period may be any suitable time period in accordance with principles of the disclosure.

The system may include the first computing device configured to receive a request to generate a dynamic QR code. The dynamic QR code may be used for authenticating a user to a mobile entity application running on a second computing device.

The request may be received via manual selection by the user of the first computing device. The user may need to be authenticated into the entity application on the first computing device in order to be able to request a dynamic QR code. The authentication at the entity application at the first computing device may be performed by verification of a user ID, password and one or more biometrics.

In some embodiments, the authentication at the first computing device may be a first-factor of authentication for authenticating the secure session at the second computing device.

The authentication at the first computing device may be performed leveraging the second computing device.

In response to the receipt of the request, the first computing device may transmit an instruction to the central server to generate the dynamic QR code.

The system may include the central server. The central server may be configured to receive the instruction from the first computing device to generate the dynamic QR code. The central server may run and process all activity occurring at both the entity application on the first computing device and the entity application on the second computing device.

In response to a receipt of the instruction, the central server may be configured to generate the dynamic QR code. The dynamic QR code may include a graphical display embedded with an instruction to a QR code reader to store, but not parse, the dynamic QR code in a processing queue. The graphical display may include a short URL associated with the dynamic QR code. The URL may be a short URL that may be redirectable. The short URL may redirect to a second URL. The second URL may be continuously changed.

The QR code may be used to authenticate the user at the second computing device. The QR code may be stored for a pre-determined time period prior to being parsed.

The short URL may be configured to redirect a web browser of the second computing device to a first website when a time of a selection of the dynamic QR code is during a first time period.

The first website when accessed, may instruct the central server to authenticate the user to the secure session.

The central server may be configured to redirect the web browser of the second computing device to a second website when the time of the selection of the dynamic QR code is during a second time period. The second time period may follow the first time period.

The second website, when accessed, may instruct the central server to deny the user, access to the secure session.

The second computing device may be configured to capture, using the QR code reader, the dynamic QR code displayed on the first computing device. The dynamic QR code, when parsed by the QR code reader, may identify the short URL.

Based on the instruction in the dynamic QR code, the second computing device may be configured to store, but not parse, the dynamic QR code in the processing queue of the QR code reader.

Wherein, at a time of a receipt of a selection of the dynamic QR code from the processing queue, the QR code reader may be configured to parse the dynamic QR code, using the QR code reader, and access the short URL.

The selection of the dynamic QR code may be selected by the user of the second computing device. The user may retrieve the dynamic QR code stored on the second computing device. At the time of the selection of the dynamic QR code, the QR code reader may be triggered to parse the dynamic QR code.

The central server may be configured to, based on the time of the receipt of the selection of the dynamic QR code, redirect the web browser of the second computing device to the first website when the time of the selection of the dynamic QR code is within the first time period. The first website may automatically authenticate the user to the secure session on the mobile entity application.

The central server may be configured to redirect the web browser of the second computing device to the second website when the time of the selection of the dynamic QR code is after the first time period thereby denying the user, access to the secure session.

It should be appreciated that in some embodiments, at the time of the retrieving of the dynamic QR code, the user is prompted to input a user ID, password and/or biometric as a factor of authentication. Following the authenticating of the user ID, password and/or biometric, the QR code may be parsed.

In some embodiments, following a lapse of the first time period, the central server may be configured to delete the dynamic QR code from the processing queue. In some embodiments, following a lapse of the first time period and the second time period, the central server may be configured to delete the dynamic QR code from the processing queue.

Following the deleting, the central server may be configured to transmit an electronic notification to the second computing device. The electronic notification may include a notification that notifies the user of the deleting of the dynamic QR code.

In some embodiments, following a lapse of the pre-determined time period, the central server may be configured to deactivate the dynamic QR code.

When the dynamic QR code is deactivated, the QR code may be reactivated when an additional element of authentication may be provided. The additional element may include another biometric signal, an answer to a personal question that may be saved in the account profile of the user and/or a newly generated OTP from a third computing device.

The central server may be further configured to, following the deactivating, initiate an alternative mode to authenticate the secure session. The alternative mode may include prompting an input for receipt of a user ID and password. The alternative mode may further include, at the second computing device, receiving input of the user ID and password. In response to the receipt of the user ID and password, the second computing device may be configured to capture a biometric of the user of the second computing device.

The central server may be configured to authenticate the user ID, password and biometric. Following the authenticating, the central server may be configured to initiate the secure session at the mobile entity application running on the second computing device.

Prior to authenticating the secure session, the central server may be configured to use an additional layer of authentication to the secure session. The additional layer may use a third computing device associated with the user for authentication.

In this embodiment, the second computing device may be configured to transmit an electronic request to the third computing device for a generation of a one-time password ("OTP").

The system may also include the third computing device. The third computing device may be a smartwatch. The third computing device may be any other smart mobile computing device.

It should be appreciated that each of the first computing device, the second computing device and the third computing device may be a part of an entity network running on the central server. The entity network may not be limited to one, two or three computing devices. The entity network may, in some embodiments, include four or more computing devices.

The third computing device may include a one-time password ("OTP") application. The OTP application may be a part of the entity network operated by the central server.

The OTP application may be resident on and/or associated with the third computing device. The third computing device may be a smartwatch.

The second computing device may be in electronic communication with the third computing device.

When the second computing device captures the dynamic QR code, the second computing device may be configured to transmit an electronic communication to the third computing device. The electronic communication may include a request for a generation, by the OTP application, of an OTP.

The generating of the OTP may be an additional layer of securing authentication of the user at the entity application.

The third computing device, upon receipt of the electronic request, may be configured to generate the OTP. In some embodiments, the central server may be configured to generate the OTP. In some embodiments, an OTP application may be running on the third computing device. The OTP application at the third computing device may generate the OTP.

Following the generation, the OTP may be displayed on a face of the third computing device for a shortened time period. The OTP may expire after a predetermined amount of time after the generating. The smartwatch may display a countdown of a number of seconds until the OTP will expire. The countdown may be underneath, or, alternatively, on top of the OTP display. The countdown may take into account the transmission delay between the second computing device, i.e.—a smartphone and the smartwatch. The countdown may include the transmission delay and a static amount of time. The amount of time may be a number of seconds.

The user of the second computing device may view the OTP and input it at the second computing device. In some embodiments, the OTP may be transferred to the second computing device when the third computing device is within a pre-determined proximity to the second computing device.

The pre-determined proximity may be a proximity that enables a wireless communication between the second computing device and the third computing device that may be leveraged without internet, i.e.—i.e.—Bluetooth®, Zigbee, Light-fidelity ("Lifi") or any other suitable wireless communication.

At the time the second computing device and the third computing device are within the pre-determined proximity and the OTP is generated, the first computing device may be outside the pre-determined proximity.

The second computing device may be configured to receive input of the OTP. The central server may be configured to confirm that the OTP is a valid OTP. Following the confirming, the central server may be configured to initiate the secure session at the mobile entity application running on the second computing device.

The OTP generation at the smartwatch, the authentication methods using the smartwatch, and communication between the smartwatch and the mobile device may include systems and methods described in U.S. patent application Ser. No. 16/929,239 filed on Jul. 15, 2020, now U.S. Pat. No. 11,296,874 which is hereby incorporated by reference herein in its entirety.

A method for pre-authenticating a user into a secure session on an entity application running on a second computing device is provided. The authenticating may be performed via a first computing device of the user as the authenticator.

The method may include receiving, at a first computing device, a user request to generate a dynamic QR code. The dynamic QR code may be for use in authenticating a user to a mobile entity application running on a second computing device.

The method may further include generating, at the first computing device, the dynamic QR code. The generating may be performed via a central server.

The dynamic QR code may include a graphical display embedded with an instruction to a QR code reader to store, but not parse, the dynamic QR code in a processing queue.

The short URL may be configured to redirect a web browser of the second computing device to a first website when a time of a selection of the dynamic QR code is during a first time period. The first website when accessed, may instruct the central server to authenticate the user to the secure session.

The method may include redirecting the web browser of the second computing device to a second website when the time of the selection of the dynamic QR code is during a second time period. The second time period may follow the first time period. The second website, when accessed, may instruct the central server to deny the user, access to the secure session.

The method may further include capturing, via a QR code reader at the second computing device, the dynamic QR code displayed on the first computing device. The dynamic QR code that, when parsed by the QR code reader, may identify the short URL.

Based on the instruction in the dynamic QR code, the method may include storing, but not parsing, the dynamic QR code in the processing queue of the QR code reader of the second computing device.

The method may include at a time of a selection of the dynamic QR code from the processing queue, parsing, via the QR code reader, the dynamic QR code.

The method may further include accessing, by the second computing device, the short URL.

The method may further include, based on the time of the receipt of the selection of the dynamic QR code, redirecting, via the central server, the web browser of the second computing device to the first website when the time of the selection of the dynamic QR code is during the first time period. The redirecting to the first website may automatically authenticate the user to the secure session on the mobile entity application.

The method may further include redirecting, via the central server, the web browser of the second computing device to the second website when the time of the selection of the dynamic QR code is during the second time period. The redirecting to the second website may deny the user, access to the secure session.

It should be appreciated that the authenticating the user into a secure session at the mobile entity app may further include authenticating the user to perform high-risk transactions. Additionally, activity relating to profile changes, administrative functions and high dollar transfers may also be authenticated on the mobile device.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative diagram of the initiating of a pre-authorizing for securing a session on a mobile entity application in accordance with principles of the disclosure.

User 102 may have computing device 104. User 102 may have computing device 106. Computing device 104, in this illustrative diagram, may be a smartphone. Computing device 106 in this diagram may be a desktop computer.

User 102 may have a personal account within entity app 108. User 102 may be authenticated into the entity application 108 running on the desktop computer 106 and may have access to the personal account profile.

In order to authenticate a secure session at the mobile entity app running on smartphone 104, the system may leverage desktop computer 106 for authentication at smartphone 104. User 102 may not always have both the desktop computer and the smartphone within close proximity to enable a quick authentication. Advanced generation of the dynamic QR code for authenticating user 102 into mobile entity app may be enabled. The dynamic QR code may then be set to be accessed at a pre-determined time in the future for authenticating the secure session.

Entity app 108 may be triggered to generate QR code 110 displayed on a user interface ("UI") of computer 106. Entity app 108 may be triggered in response to input from user 102. User 102 may select an option displayed on the UI within entity app 108 for generating a QR code.

Following the display of QR code 110 on computer 106, smartphone 104 may capture the QR code, as shown at 112. Smartphone 104a may be an enlarged display of smartphone 104 to include the UI at 104.

QR code 112 may be stored at smartphone 104. QR code 112 may be stored at central server 116. QR code 112 may not be parsed by a QR code reader at the time of capturing. QR code 112 may be stored as a graphical image for a pre-determined amount of time.

In some embodiments, when QR code 112 is not retrieved within the pre-determined amount of time, QR code 112 may be deleted from memory 114.

Figure 2:
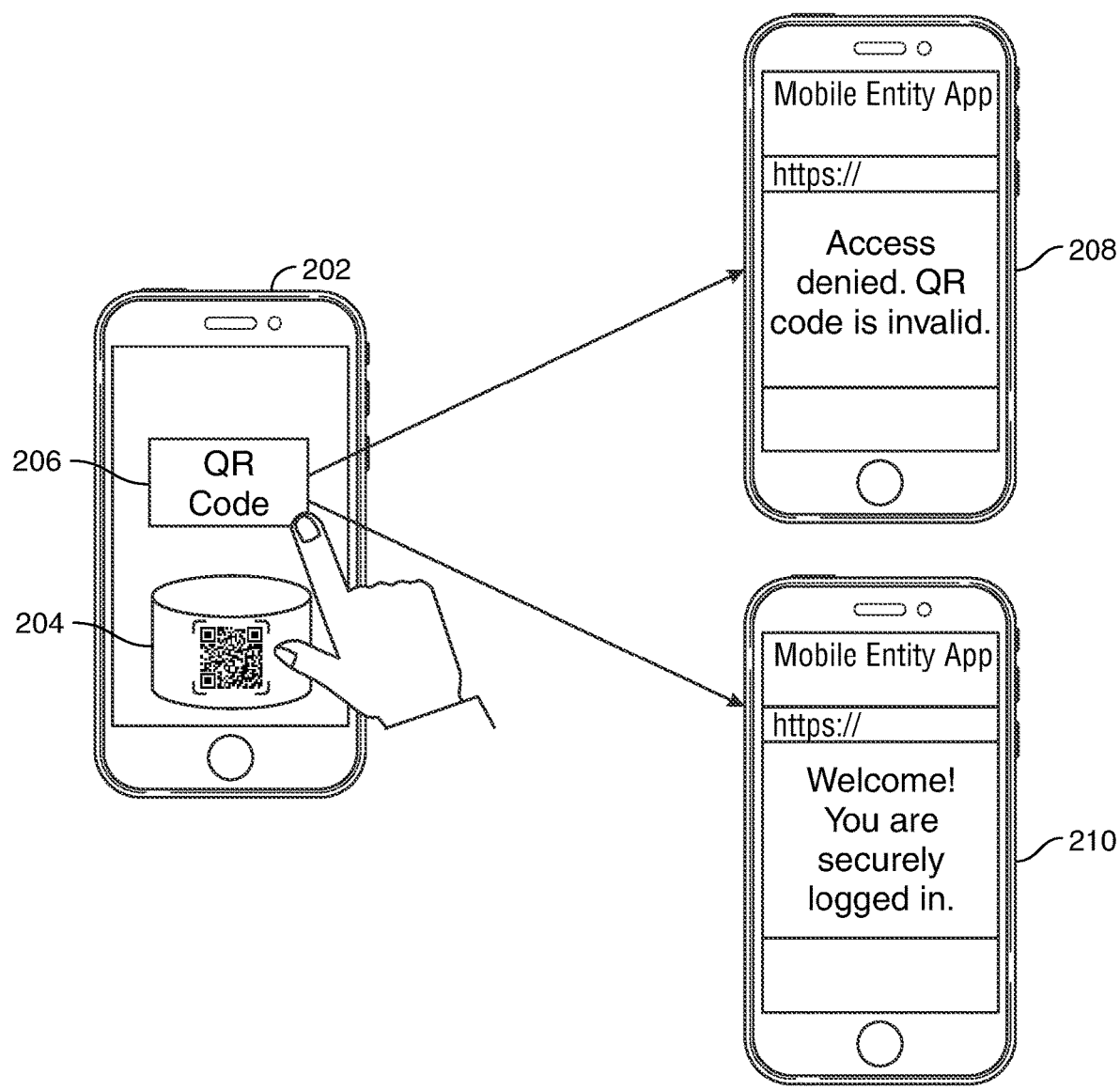
FIG. 2 shows an illustrative diagram in accordance with principles of the disclosure.

FIG. 2 shows a selection of the dynamic QR code for enabling authentication in accordance with principles of the disclosure.

At smartphone 202, QR code 206 may be retrieved. QR code 206 may be retrieved from data repository 204.

In some embodiments, prior to a selection of the dynamic QR code, the user may be prompted to input a user ID and password and/or biometric signal as an additional form of authentication for the mobile entity app running on smartphone 202.

Following authentication of the user ID, password and/or biometric, the dynamic QR code may be available for retrieving. The user may not be able to retrieve the QR code prior to the additional form of authentication.

At the time the QR code is generated, a time period may be selected. The time period may be selected by the user of device 202. The time period may be a range of time that the user would expect to be able to access the user's mobile entity app. The time period may be embedded within the QR code. The time period may be tagged to the QR code.

When the QR code is retrieved during the selected time period, the user may be enabled to be authenticated into the secure session at the mobile entity app, as shown at UI 210. When the QR code is retrieved prior to, or after the selected time period, the user may be denied authentication, as shown at 208.

Figure 3:
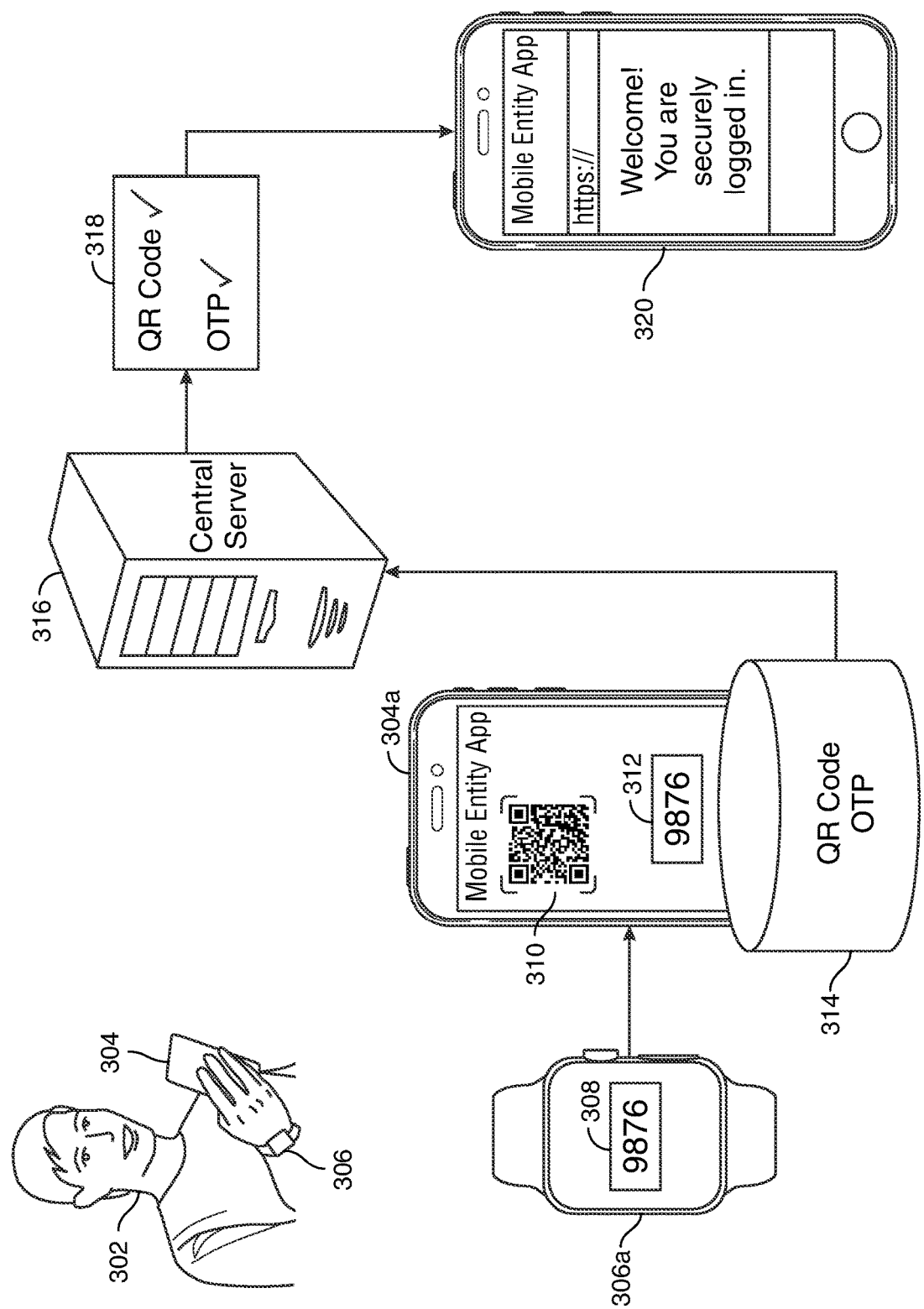
FIG. 3 shows an illustrative diagram in accordance with principles of the disclosure.

FIG. 3 shows an illustrative diagram of authentication at the mobile entity app leveraging an additional form of authentication in accordance with principles of the disclosure.

User 302 may have smartphone 304. User 302 may have smartwatch 306. User 302 may also have desktop computer 106 (illustrated in FIG. 1).

Dynamic QR code generated in FIG. 1 may be stored at smartphone 304. QR code 310 may also be stored at central server 316.

In this illustrative diagram, following authentication of a user ID and password and/or biometric, QR code 310 may be available for retrieval. Smartphone 304a may be an enlarged display of smartphone 304.

Upon retrieval of the QR code 310, an electronic communication may be automatically transmitted from smartphone 304 to smartwatch 306. The electronic communication may be an instruction to an OTP application at smartphone 306 to generate an OTP. The OTP application may be running on smartwatch 306. The OTP application may be running at central server 316.

The OTP application may generate the OTP, as shown at 308. Smartwatch 306a may be an enlarged display of smartwatch 306 to include the UI. The OTP generated may be '9876'. The OTP may be displayed for a reduced time period. The reduced time period may not be greater than 50% of a pre-determined time period.

OTP 308 may be transmitted to smartphone 304. OTP 308 may be manually inputted to mobile entity app at smartphone 304. OTP 308 may be displayed on the UI of 304 as shown at 312.

QR code 310 and OTP 308 may be stored at smartphone 304, as shown at 314.

Central server 316, upon receipt of the OTP, may authenticate the OTP as being the OTP generated by the OTP application. Following authentication, QR code 310 may automatically be parsed by a QR code reader.

When determined that that QR code 310 is retrieved within the selected time period, central server 316 may authenticate the user into the secure session within the mobile entity app on smartphone 304, as shown at UI 320.

Figure 4:
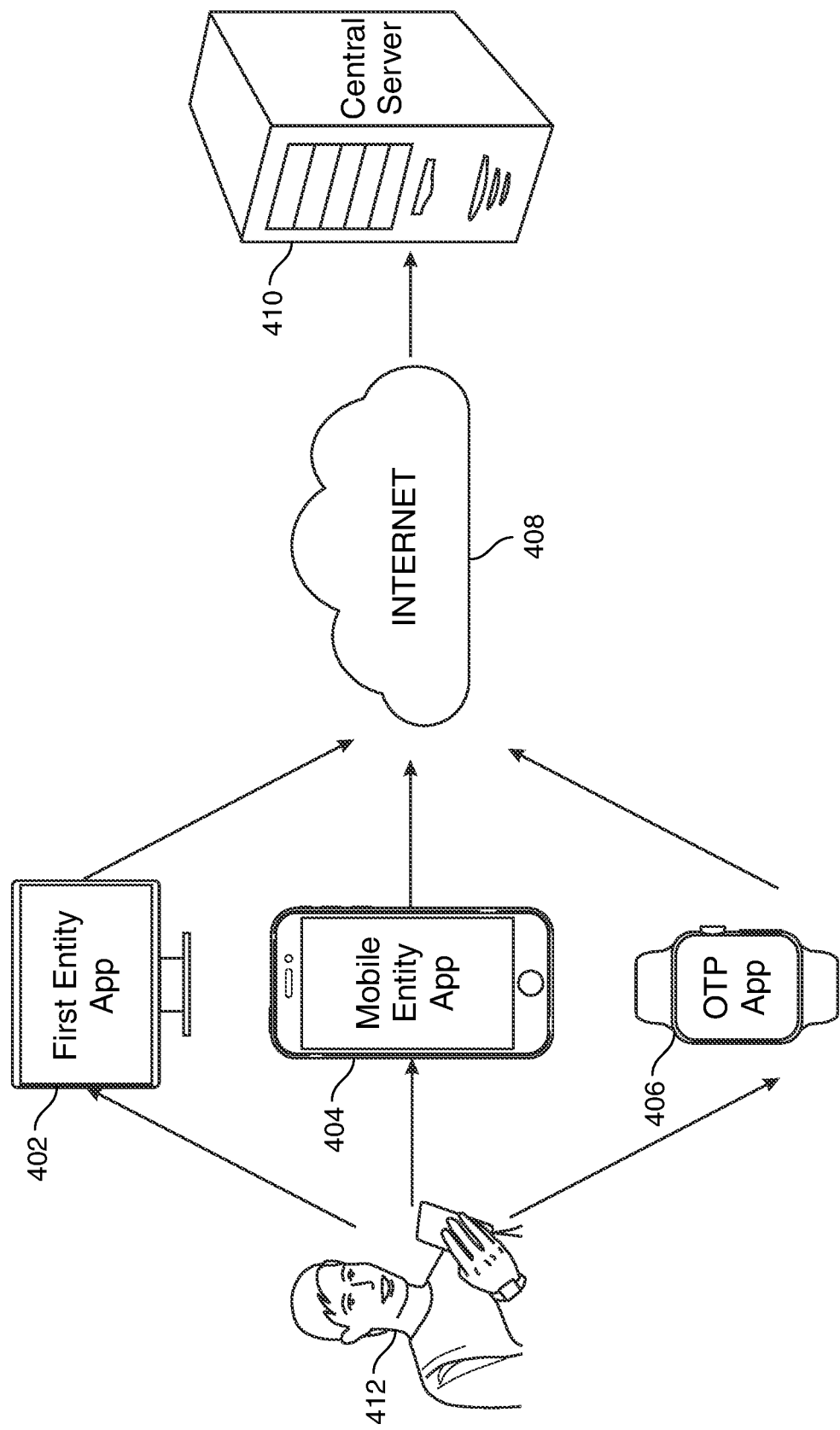
FIG. 4 shows an illustrative diagram in accordance with principles of the disclosure.

FIG. 4 shows a first computing device 402, a second computing device 404 and a third computing device 406. Each of computing devices 402, 404 and 406 may be associated with user 412.

Each of computing devices 402, 404 and 406 may be part of an entity network running on central server 410. Each of computing devices 402, 404 and 406 may connect to central server 410 via internet 408.

Each of computing devices 402-406 may have the entity application running on the computing device. The user may need to be authenticated at each entity application. User may leverage one or more of the computing devices to authenticate the user.

It should be appreciated that user 412 may have additional computing devices not illustrated. Each additional computing device may have the entity application running on the computing device.

In some embodiments two of the computing devices may be used for authentication into a secure session of the entity application. In some embodiments all three computing devices may be used for authentication into a secure session of the entity application.

Figure 5:
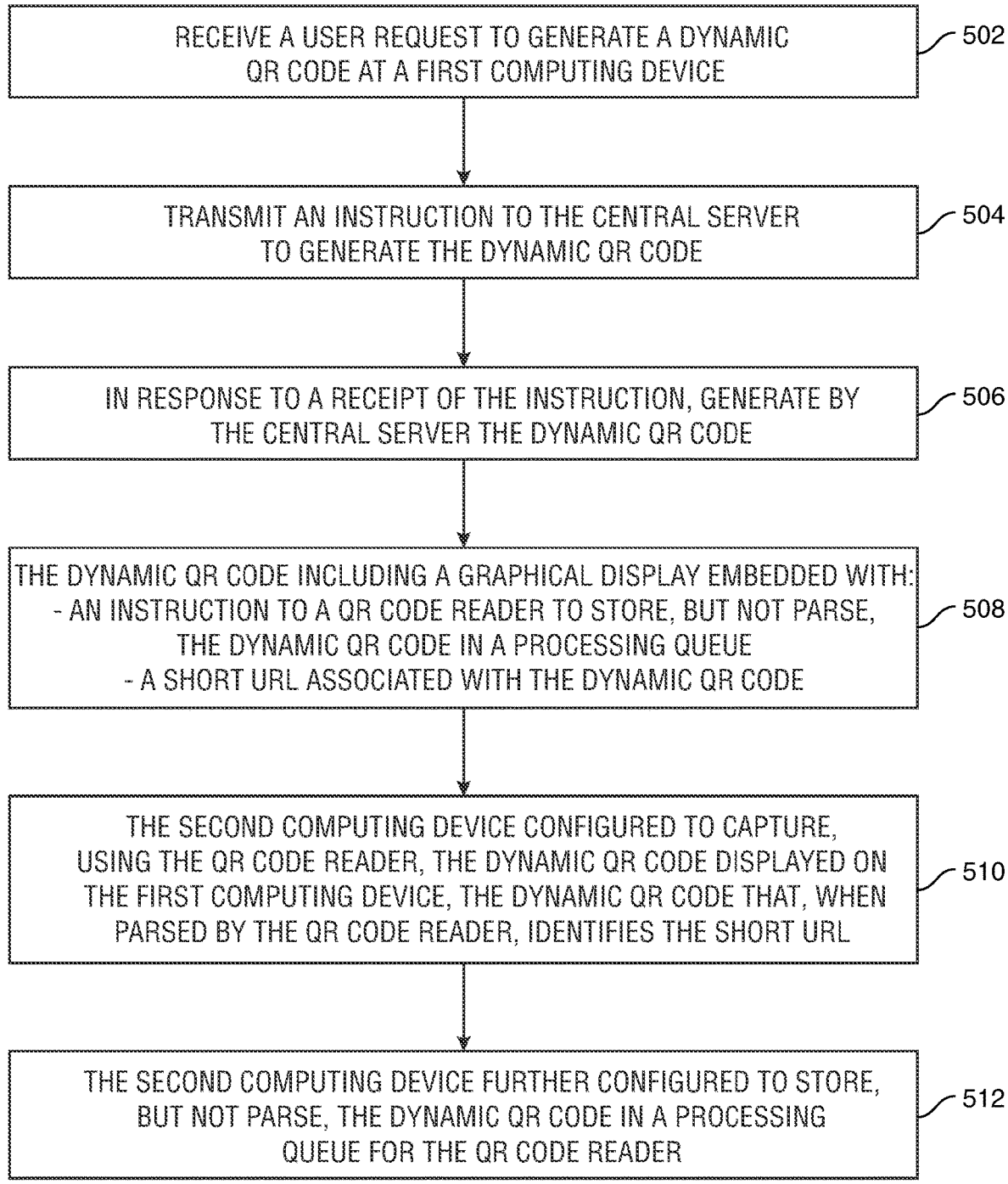
FIG. 5 shows an illustrative flow chart in accordance with principles of the disclosure.

FIG. 5 shows an illustrative method in accordance with principles of the disclosure.

At step 502, a first computing device may be configured to receive a user request to generate a dynamic QR code.

At step 504, the first computing device may be configured to transmit an instruction to the central server to generate the dynamic QR code.

At step 506, in response to a receipt of the instruction at the central server, the central server may be configured to generate the dynamic QR code.

The dynamic QR code, as shown at 508, may include a graphical display embedded with an instruction to a QR code reader. The instruction may be to store, but not parse, the dynamic QR code in a processing queue. The graphical display may also be embedded with a short URL associated with the dynamic QR code.

At step 510, the second computing device may be configured to capture, using the QR code reader, the dynamic QR code displayed on the first computing device. It should be appreciated that the dynamic QR code, when parsed by the QR code reader, may identify the short URL.

At step 512, the second computing device may be further configured to store, but not parse, the dynamic QR code in a processing queue.

Figure 6:
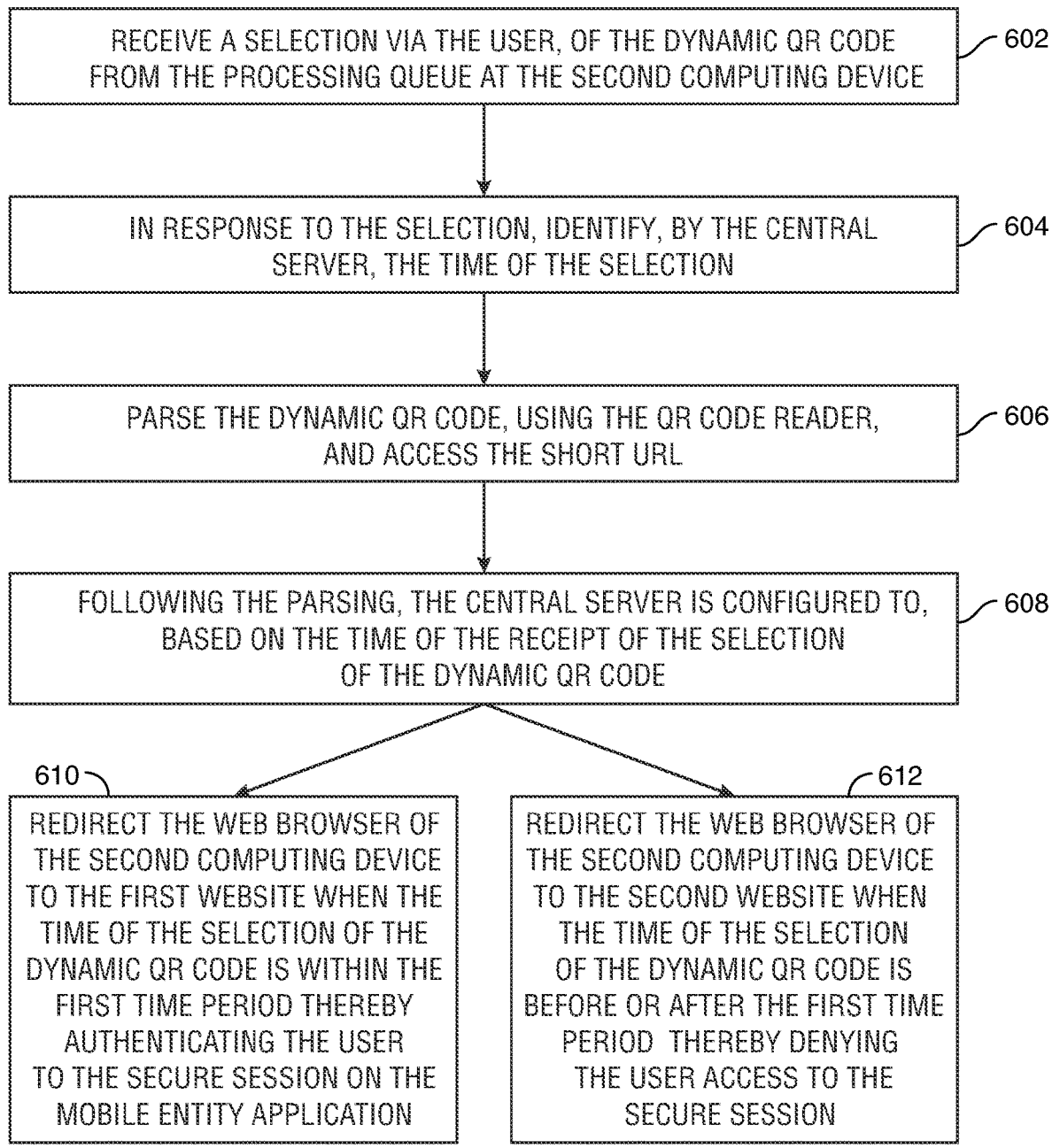
FIG. 6 shows an illustrative flow chart in accordance with principles of the disclosure.

FIG. 6 shows an illustrative method in accordance with principles of the disclosure.

At step 602, the second computing device may be configured to receive a selection via the user, of the dynamic QR code from the processing queue.

At step 604, the central server may be configured to in response to the selection, identify the time of the selection.

The identifying of the time of the selection may be compared to the time period embedded in the QR code. When the time of the selection is within the time period, the user may be authenticated.

At step 606, the QR code reader may parse the dynamic QR code and access the short URL. The QR code reader may be running on the second computing device. The QR code reader may be running at the central server.

At step 608, the central server may be configured to, following the parsing, either authenticate or deny the user into the secure session within the mobile entity app. The authentication of denial may be based on the time of the receipt of the retrieval of the dynamic QR code.

As shown at 610, when the time of the selection of the dynamic QR code is within the first time period, the central server may be configured to redirect the web browser of the second computing device to a first website. The redirecting to the first website thereby automatically authenticating the user to the secure session.

As shown at 612, when the time of the selection of the dynamic QR code is before or after the first time period, the central server may be configured to redirect the web browser of the second computing device to the second website. The redirecting to the second website thereby denying the user access to the secure session.

Figure 7:
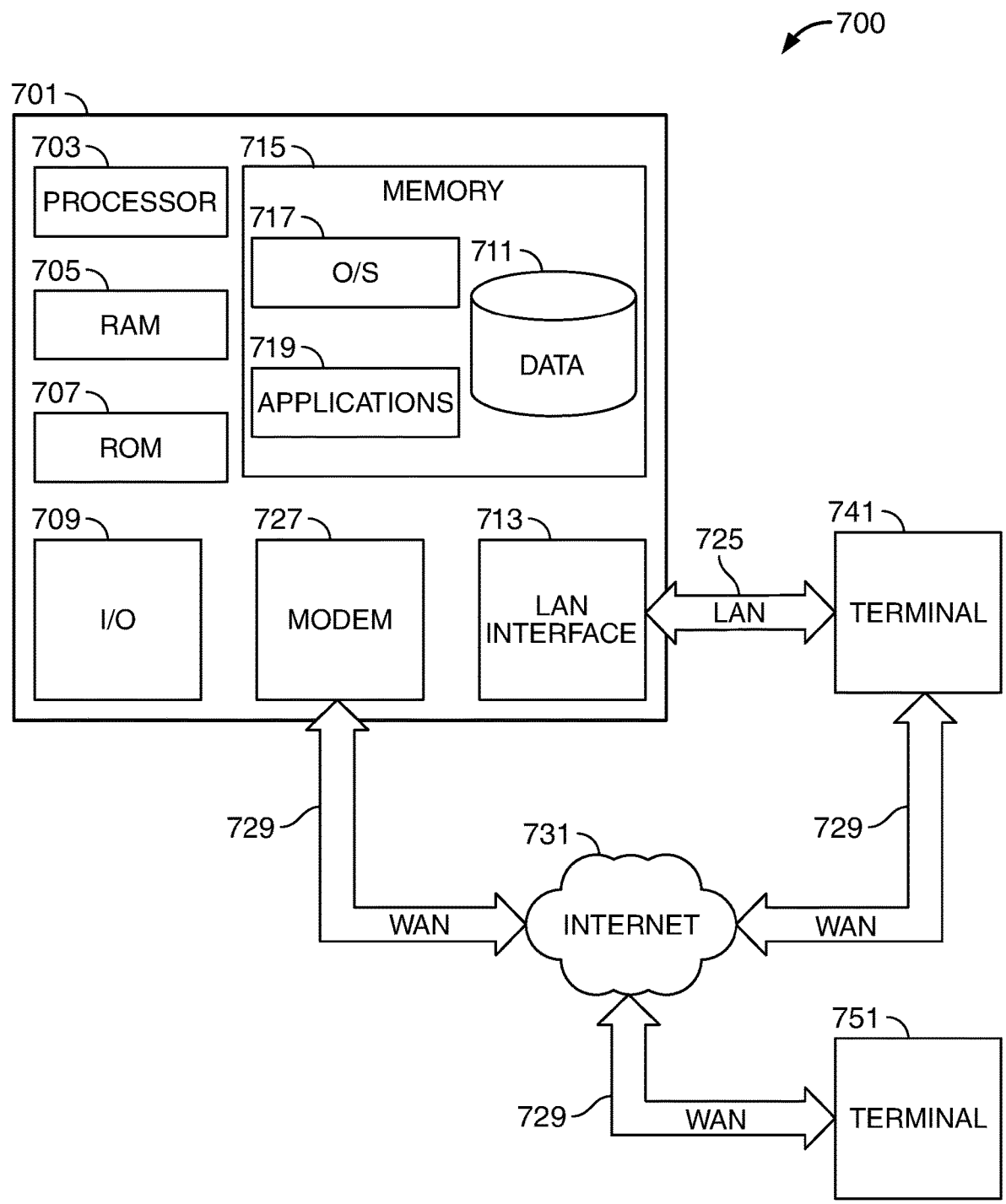
FIG. 7 shows an illustrative block diagram in accordance with principles of the disclosure.

FIG. 7 shows an illustrative block diagram of system 700 that includes computer 701. Computer 701 may alternatively be referred to herein as an "engine," "server" or a "computing device." The computing system may include one or more computer servers 701. Computer 701 may be any computing device described herein, such as the first computing device, the second computing device, the third computing device and the central server. Elements of system 700, including computer 701, may be used to implement various aspects of the systems and methods disclosed herein.

Computer 701 may have a processor 703 for controlling the operation of the device and its associated components, and may include RAM 705, ROM 707, input/output circuit 709, and a non-transitory or non-volatile memory 715. Machine-readable memory may be configured to store information in machine-readable data structures. Other components commonly used for computers, such as EEPROM or Flash memory or any other suitable components, may also be part of the computer 701.

The memory 715 may be comprised of any suitable permanent storage technology—e.g., a hard drive. The memory 715 may store software including the operating system 717 and application(s) 719 along with any data 711 needed for the operation of computer 701. Memory 715 may also store videos, text, and/or audio assistance files. The data stored in Memory 715 may also be stored in cache memory, or any other suitable memory.

Input/output ("I/O") module 709 may include connectivity to a microphone, keyboard, touch screen, mouse, and/or stylus through which input may be provided into computer 701. The input may include input relating to cursor movement. The input/output module may also include one or more speakers for providing audio output and a video display device for providing textual, audio, audiovisual, and/or graphical output. The input and output may be related to computer application functionality.

Computer 701 may be connected to other systems via a local area network (LAN) interface 713. Computer 701 may operate in a networked environment supporting connections to one or more remote computers, such as terminals 741 and 751. Terminals 741 and 751 may be personal computers or servers that include many or all of the elements described above relative to computer 701.

When used in a LAN networking environment, computer 701 is connected to LAN 725 through a LAN interface 713 or an adapter. When used in a WAN networking environment, computer 701 may include a modem 727 or other means for establishing communications over WAN 729, such as Internet 731.

In some embodiments, computer 701 may be connected to one or more other systems via a short-range communication network (not shown). In these embodiments, computer 701 may communicate with one or more other terminals 741 and 751, using a PAN such as Bluetooth®, NFC, ZigBee, or any other suitable personal area network.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 719, which may be used by computer 701, may include computer executable instructions for invoking functionality related to communication, such as e-mail, Short Message Service (SMS), and voice input and speech recognition applications. Application program(s) 719 (which may be alternatively referred to herein as "plugins," "applications," or "apps") may include computer executable instructions for invoking functionality related to performing various tasks. Application programs 719 may utilize one or more algorithms that process received executable instructions, perform power management routines or other suitable tasks.

Application programs 719 may include the mobile entity application, the entity application, the OTP application, the QR code reader application and any other application described herein.

Application program(s) 719 may include computer executable instructions (alternatively referred to as "programs"). The computer executable instructions may be embodied in hardware or firmware (not shown). Computer 701 may execute the instructions embodied by the application program(s) 719 to perform various functions.

Application program(s) 719 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 719 may include one or more algorithms that may be used to implement features of the disclosure.

The invention may be described in the context of computer-executable instructions, such as applications 719, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 701 and/or terminals 741 and 751 may also include various other components, such as a battery, speaker, and/or antennas (not shown). Components of computer system 701 may be linked by a system bus, wirelessly or by other suitable interconnections. Components of computer system 701 may be present on one or more circuit boards. In some embodiments, the components may be integrated into a single chip. The chip may be silicon-based.

Terminal 751 and/or terminal 741 may be portable devices such as a laptop, cell phone, Blackberry™, tablet, smartphone, or any other computing system for receiving, storing, transmitting and/or displaying relevant information. Terminal 751 and/or terminal 741 may be one or more user devices. Terminals 751 and 741 may be identical to computer 701 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like.

Figure 8:
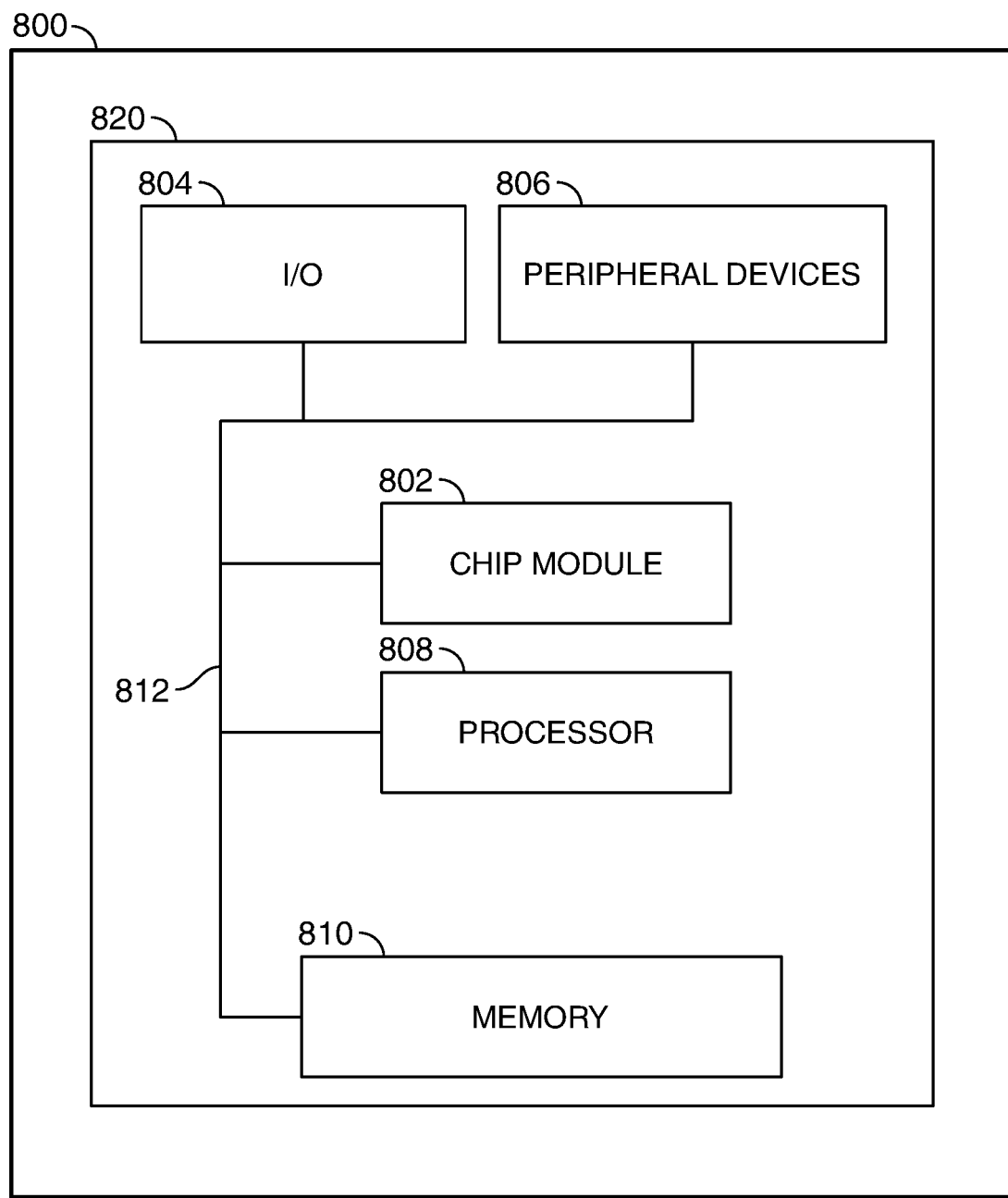
FIG. 8 shows an illustrative apparatus that may be configured in accordance with principles of the disclosure.

FIG. 8 shows illustrative apparatus 800 that may be configured in accordance with the principles of the disclosure. Apparatus 800 may be a computing device. Apparatus 800 may include chip module 802, which may include one or more integrated circuits, and which may include logic configured to perform any other suitable logical operations.

Apparatus 800 may include one or more of the following components: I/O circuitry 804, which may include a transmitter device and a receiver device and may interface with fiber optic cable, coaxial cable, telephone lines, wireless devices, PHY layer hardware, a keypad/display control device or any other suitable media or devices; peripheral devices 806, which may include counter timers, real-time timers, power-on reset generators or any other suitable peripheral devices; logical processing device 808, which may compute data structural information and structural parameters of the data; and machine-readable memory 810.

Machine-readable memory 810 may be configured to store in machine-readable data structures: machine executable instructions, (which may be alternatively referred to herein as "computer instructions" or "computer code"), applications such as applications 819, signals, and/or any other suitable information or data structures.

Components 802, 804, 806, 808 and 810 may be coupled together by a system bus or other interconnections 812 and may be present on one or more circuit boards such as circuit board 820. In some embodiments, the components may be integrated into a single chip. The chip may be silicon-based.

Thus, systems and methods for pre-authenticating a user into a secure session on an entity application running on one computing device using a second computing device as an authenticator is provided. Persons skilled in the art will appreciate that the present invention can be practiced by other than the described embodiments, which are presented for purposes of illustration rather than of limitation.

What is claimed is:

1. A system for pre-authenticating a user into a secure session on an entity application running on a second computing device, the pre-authenticating using a first computing device of the user as an authenticator, the first computing device and the second computing device being in electronic communication with a central server, the system comprising:
   the second computing device configured to receive a request from a user to generate a dynamic QR code, the dynamic QR code for use in authenticating a user to a mobile entity application running on the second computing device, the request including a user selected time period, the user selected time period being a time the user is authenticated to access the entity application;
   the first computing device configured to receive the user request from the second computing device;
   the central server configured to:
     receive the user request from the first computing device to generate the dynamic QR code; and
     in response to a receipt of the instruction, generate the dynamic QR code, the dynamic QR code including a graphical display embedded with:
       an instruction to a QR code reader to store, but not parse, the dynamic QR code in a processing queue of the QR code reader, wherein the instruction to not parse is an instruction to not extract the short URL from the dynamic QR code;
       the selected time period; and
       a short URL associated with the dynamic QR code, wherein the short URL instructs the central server to:
         redirect a web browser of the second computing device to a first website when a time of a receipt of a selection of the dynamic QR code is during the selected time period, wherein the first website, when accessed, instructs the central server to authenticate the user to the secure session; and
         redirect the web browser of the second computing device to a second website when the time of a receipt of a selection of the dynamic QR code is outside the selected time period, the second website, when accessed, instructs the central server to deny the user access to the secure session;
   the first computing device being configured to receive the dynamic QR code from the central server and display the dynamic QR code on a user interface; and
   the second computing device configured to:
     capture, using the QR code reader, the dynamic QR code displayed on the first computing device, the dynamic QR code that, when parsed by the QR code reader, identifies the short URL;
     based on the instruction in the dynamic QR code, store, but not parse, the dynamic QR code in the processing queue of the QR code reader; and
     at a time of a receipt of a selection of the dynamic QR code from the processing queue, the QR code reader is configured to parse the dynamic QR code, using the QR code reader, and access the short URL.

2. The system of claim 1 wherein following a lapse of the selected time period, the central server is configured to deactivate the dynamic QR code.

3. The system of claim 2, wherein the central server is further configured to, following the deactivating, initiate an alternative mode to authenticate the secure session, the alternative mode comprising:
   prompting an input for receipt of a user ID and password;
   receiving input of the user ID and password;
   capturing a biometric signal associated with the user of the second computing device;
   authenticating the user ID, password and the biometric signal via the central server; and
   following the authenticating, initiating the secure session.

4. The system of claim 1 wherein, prior to authenticating the secure session, the central server is configured to use an additional layer of authentication to the secure session, the additional layer using a third computing device associated with the user.

5. The system of claim 4 wherein:
   the second computing device is configured to transmit an electronic request to the third computing device for a generation of a one-time password ("OTP"); and
   the third computing device, upon receipt of the electronic request, is configured to:
     generate the OTP; and
     display the OTP on a face of the third computing device.

6. The system of claim 5 wherein the second computing device is configured to:
   receive input of the OTP;
   confirming by the central server that the OTP is a valid OTP; and
   following the confirming, initiate the secure session.

7. The system of claim 1 wherein the first computing device is a desktop computing device.

8. The system of claim 1 wherein the second computing device is a mobile device.

9. The system of claim 1 wherein the dynamic QR code is stored at the second computing device for a maximum of a 24 hour period of time from a time of the capturing.

10. A method for pre-authenticating a user into a secure session on an entity application running on a second computing device, the pre-authenticating using a first computing device of the user as an authenticator, the first computing device and the second computing device being in electronic communication with a central server, the method comprising:
   receiving, at a second computing device, a request from a user to generate a dynamic QR code, the dynamic QR code for use in authenticating a user to a mobile entity application running on the second computing device, the request including a user selected time period, the user selected time period being a time the user is authenticated to access the entity application;
   receiving, at a first computing device, the user request;
   receiving the user request at the central server;

in response to the receiving, generating the dynamic QR code by the central server, the dynamic QR code including a graphical display embedded with:
an instruction to a QR code reader to store, but not parse, the dynamic QR code in a processing queue of the QR code reader, wherein the instruction to not parse is an instruction to not extract the short URL from the dynamic QR code;
the selected time period; and
a short URL associated with the dynamic QR code, wherein the short URL instructs the central server to:
redirect a web browser of the second computing device to a first website when a time of a receipt of a selection of the dynamic QR code is during the selected time period, wherein the first website, when accessed, instructs the central server to authenticate the user to the secure session; and
redirect the web browser of the second computing device to a second website when the time of a receipt of a selection of the dynamic QR code is outside the selected time period, the second website, when accessed, instructs the central server to deny the user, access to the secure session;
receiving, at the first computing device, the dynamic QR code from the central server;
displaying the dynamic QR code on a user interface;
capturing, via a QR code reader at the second computing device, the dynamic QR code displayed on the first computing device, the dynamic QR code that, when parsed by the QR code reader, identifies the short URL;
based on the instruction in the dynamic QR code, storing, but not parsing, the dynamic QR code in the processing queue of the QR code reader of the second computing device; and
at a time of a receipt of a selection of the dynamic QR code from the processing queue:
parsing, via the QR code reader, the dynamic QR code; and
accessing, by the second computing device, the short URL.

11. A system for pre-authenticating a user into a secure session on an entity application running on a second computing device, the pre-authenticating using a first computing device of the user as an authenticator, the first computing device and the second computing device being in electronic communication with a central server, the system comprising:
the second computing device configured to receive a request from a user to generate a dynamic QR code, the dynamic QR code for use in authenticating a user to a mobile entity application running on the second computing device, the request including a user selected time period, the user selected time period being a time the user is authenticated to access the entity application;
a first computing device configured to receive the user request from the second computing device;
the central server configured to:
receive the user request from the first computing device to generate the dynamic QR code; and
in response to a receipt of the instruction, generate the dynamic QR code, the dynamic QR code including a graphical display embedded with:
an instruction to a QR code reader to store, but not parse, the dynamic QR code in a processing queue of the QR code reader, wherein the instruction to not parse is an instruction to not extract the short URL from the dynamic QR code;
the selected time period; and
a short URL associated with the dynamic QR code, wherein the short URL instructs the central server to:
redirect a web browser of the second computing device to a first website when a time of a receipt of a selection of the dynamic QR code is during the selected time period, the first website when accessed, instructs the central server to authenticate the user to the secure session; and
redirect the web browser of the second computing device to a second website when the time of a receipt of a selection of the dynamic QR code is outside the selected time period, the second website, when accessed, instructs the central server to deny the user access to the secure session;
the second computing device configured to:
capture, using the QR code reader, the dynamic QR code displayed on the first computing device, the dynamic QR code that, when parsed by the QR code reader, identifies the short URL; and
based on the instruction in the dynamic QR code, store, but not parse, the dynamic QR code in the processing queue of the QR code reader;
at a time of a receipt of a selection of the dynamic QR code from the processing queue, the central server is configured to trigger a generating of a one-time password ("OTP") at a third computing device, the third computing device being within a pre-determined proximity to the second computing device;
an OTP application running on the third computing device is configured to:
generate the OTP; and
display the OTP on a face of the third computing device;
the second computing device is configured to:
prompt the user for input of the OTP;
in response to the prompt, receive input of the OTP; and
transmit the OTP to the central server for verification; and
in response to a receipt of verification from the central server, the QR code reader is configured to parse the dynamic QR code, using the QR code reader, and access the short URL.

12. The system of claim 11 wherein the pre-determined proximity is a proximity that enables a wireless communication between the second computing device and the third computing device.

13. The system of claim 11 wherein when the second computing device and the third computing device are within the pre-determined proximity, the first computing device is outside the pre-determined proximity.

* * * * *